& Hamilton, LLP

(12) United States Patent
Zhang (10) Patent No.: US 10,417,420 B2
(45) Date of Patent: Sep. 17, 2019

(54) MALWARE DETECTION AND CLASSIFICATION BASED ON MEMORY SEMANTIC ANALYSIS

(71) Applicant: Fortinet, Inc., Sunnyvale, CA (US)

(72) Inventor: Jie Zhang, Langley (CA)

(73) Assignee: Fortinet, Inc., Sunnyvale, CA (US)

( * ) Notice: Subject to any disclaimer, the term of this patent is extended or adjusted under 35 U.S.C. 154(b) by 212 days.

(21) Appl. No.: 15/335,224

(22) Filed: Oct. 26, 2016

(65) Prior Publication Data
US 2018/0114018 A1 Apr. 26, 2018

(51) Int. Cl.
*G06F 21/56* (2013.01)

(52) U.S. Cl.
CPC ...... *G06F 21/562* (2013.01); *G06F 2221/034* (2013.01)

(58) Field of Classification Search
CPC .................. G06F 21/562; G06F 12/14
See application file for complete search history.

(56) References Cited

U.S. PATENT DOCUMENTS

| 7,996,904 | B1* | 8/2011 | Chiueh | G06F 21/566 |
| | | | | 713/150 |
| 9,355,246 | B1* | 5/2016 | Wan | G06F 21/566 |
| 9,355,247 | B1* | 5/2016 | Thioux | G06F 21/55 |
| 9,383,934 | B1* | 7/2016 | Lukacs | G06F 3/0622 |
| 9,922,192 | B1* | 3/2018 | Kashyap | G06F 21/566 |
| 2008/0040710 | A1* | 2/2008 | Chiriac | G06F 21/566 |
| | | | | 717/136 |
| 2009/0313700 | A1* | 12/2009 | Horne | G06F 21/564 |
| | | | | 726/24 |
| 2010/0031353 | A1* | 2/2010 | Thomas | G06F 11/3604 |
| | | | | 726/22 |
| 2011/0041179 | A1* | 2/2011 | St Hlberg | G06F 21/566 |
| | | | | 726/23 |
| 2012/0079596 | A1* | 3/2012 | Thomas | G06F 21/55 |
| | | | | 726/24 |
| 2013/0091571 | A1* | 4/2013 | Lu | G06F 21/563 |
| | | | | 726/23 |
| 2015/0135262 | A1* | 5/2015 | Porat | G06F 21/552 |
| | | | | 726/1 |
| 2016/0180088 | A1* | 6/2016 | Zhang | G06F 21/564 |
| | | | | 726/23 |
| 2018/0018460 | A1* | 1/2018 | Brown | G06F 21/566 |

* cited by examiner

*Primary Examiner* — Hee K Song
(74) *Attorney, Agent, or Firm* — Jaffery Watson Mendosa & Hamilton, LLP (57) ABSTRACT

Systems and methods for malware detection and classification based on semantic analysis of memory dumps of malware are provided. According to one embodiment, a malware detector running within a computer system causes a sample file to be executed within a target process that is monitored by a process monitor of the malware detector. One or more memory dumps associated with the sample file are captured by the process monitor. A determination regarding whether the sample file represents malware is made by the malware detector by analyzing characteristics of at least one memory dump of the one or more memory dumps with reference to characteristics of memory dumps of a plurality of known malware samples.

20 Claims, 10 Drawing Sheets

MALWARE DETECTION AND CLASSIFICATION BASED ON MEMORY SEMANTIC ANALYSIS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to network security. In particular, embodiments of the present invention relate to automated malware detection and classification by performing memory semantic analysis.

Description of the Related Art

Cyber security experts and hackers are in a continuous battle that is not going to end anytime soon. Cyber attackers are becoming smarter and use advanced software and hardware technologies to initiate different types of attacks on computers/networks. A hacker/cyber attacker typically uses various types of malicious software such as viruses, worms, and Trojan horses for conducting illegitimate operations in computer systems and/or to get illegitimate access to networks and/or network resources. Such malicious software/content may be used, for example, to cause damage to data or equipment, or to extract or modify data.

There are several security checks implemented within computer networks to detect and filter out malicious traffic/content/files. Detection of malware/cyber intrusion attempts is the first step towards securing computers/networks, and for implementing security checks at different levels such as at firewalls, gateways, and end user devices. Existing detection systems typically rely on signatures of known malware/malicious content/file/traffic to detect and filter them out. Therefore, most of the present day commercial anti-virus (AV) and intrusion detection systems (IDSs) rely largely on signature-based methods to identify malicious code before the code causes harm to computer systems and/or travels through the network.

In typical signature-based systems, signatures of malicious code/traffic/file/content are stored in a signature database, which is updated at regular intervals with signatures of newly detected malicious code/traffic/file/content. Therefore, for an IDS to be able to detect a threat/malware, the signature, which is essentially a fingerprint for malware, should already be known and deployed within the IDS, usually through an AV update and/or a patch. Because signature-based systems are dependent on signatures relating to known threats, this paradigm has several drawbacks. For example, known malware may be packed with various unknown packers (e.g., a piece of software that takes an original malware file and compresses it, in an attempt to obfuscate the executable code) to avoid being detected by signature-based detection systems. Additionally, in order to defeat behavior-based detection systems, some new malware check the run-time environment and refuse to run when the check is indicative of the run-time environment being a sandbox system.

Therefore, there is a need for improved malware detection and classification systems based on semantic analysis of memory dumps of the malware to mitigate or even solve all these problems.

SUMMARY

Systems and methods are described for malware detection and classification based on semantic analysis of memory dumps of malware. According to one embodiment, a malware detector running within a computer system causes a sample file to be executed within a target process that is monitored by a process monitor of the malware detector. One or more memory dumps associated with the sample file are captured by the process monitor. A determination regarding whether the sample file represents malware is made by the malware detector by analyzing characteristics of at least one memory dump of the one or more memory dumps with reference to characteristics of memory dumps of a plurality of known malware samples.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Systems and methods are described for malware detection and classification based on semantic analysis of memory dumps of malware. According to one embodiment, a malware detector runs a sample file in a target process that is monitored by a process monitor of the malware detector. The process monitor retrieves a memory dump of the sample file.

Features of the memory dump of the sample file are analyzed by the malware detector. The sample file is determined to be a malware if the features of the memory dump of the sample file match with features of the malware.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

Figure 1:
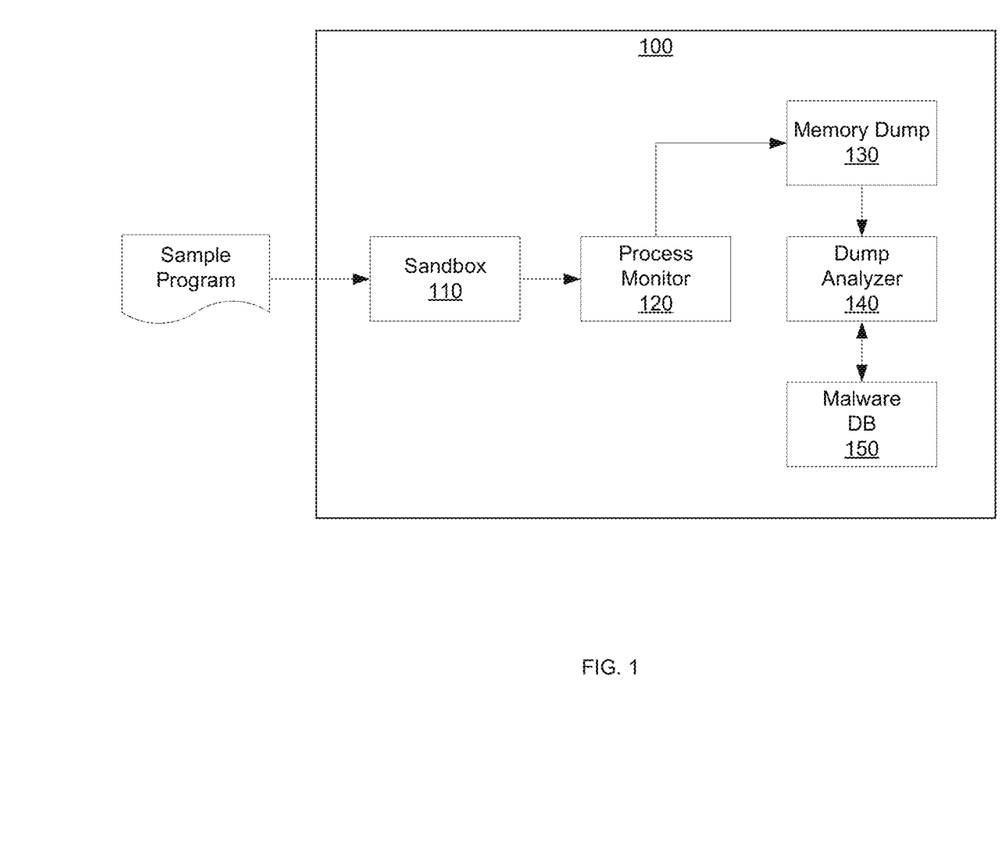
FIG. 1 illustrates exemplary functional units of a malware detection and classification system based on semantic analysis of memory dumps in accordance with an embodiment of the present invention.

FIG. 1 illustrates exemplary functional units of a malware detection and classification system 100 in accordance with an embodiment of the present invention. In the present example, malware detection and classification system 100 includes a sandbox 110, a process monitor 120, a memory dump 130, a dump analyzer 140 and a malware DB 150. In one example, malware detection and classification system 100 may be a malware detection subscription service (e.g., the FORTIGUARD Web Filtering Service available from the assignee of the present invention). Malware detection and classification system 100 may collect millions of sample files from subscribers over the Internet. According to one embodiment, as described in further detail below, the sample files may be scanned by a file signature-based malware detection engine. If no malware is detected by the file signature based malware detection engine, the sample files may be run in sandbox 110, which performs behavior-based malware detection. If no malware is detected by the behavior-based malware detection, a memory dump based malware detection process may then be executed to determine whether the sample file represents malware. After the sample file is classified by malware detection and classification system 100, the classification is returned to the subscriber and the subscriber may allow or block the sample file based on the returned classification.

In an alternative implementation scenario, malware detection and classification system 100 may be part of a stand-alone network security appliance deployed within a private network. Malware detection and classification system 100 may detect and classify files intercepted by a firewall of the private network. The firewall of the private network may allow or block transmission/reception of the intercepted files based on the classifications by malware detection and classification system 100.

Sandbox 110 is used for running sample files in a sandbox environment in which behaviors of sample files, including, but not limited to, network accesses, disk accesses and/or memory accesses are controlled and monitored by a behavior-based malware detection system. The patterns of behaviors of sample files may be detected by the behavior-based malware detection system to determine whether the sample files are malware. For malware that has the ability to check the run-time environment and refuses to run within sandbox 110, the behavior-based malware detection system can invoke further malware analysis (e.g., by capturing one or more memory dumps of the potential malware, which may be further analyzed to detect whether or not the potential malware is in fact malware and attempt to identify the malware family and variant).

Process monitor 120 is used for capturing one or more memory snapshots of processes associated with a sample file running in sandbox 110. Process monitor 120 may monitor one or more target processes launched during execution of the sample file and take one or more memory snapshots at appropriate opportunities to create memory dump 130.

Dump analyzer 140 is used for detecting malware based on memory dump 130 of a process when the malware is run in sandbox 110. For a sample file that appears as a new malware sample at least in part as a result of an old (known) malware sample being packed by a customer packer, a malware detection engine with a file signature capable of detecting the old (known) malware file may fail to detect the new malware file as a result of the changed file structure resulting, for example, from application by the malware author of the customer packer to the old malware file. It may also be difficult to directly unpack the sample file by the malware detection system. While it is relatively easy to create customer packers, it is more difficult for a malware detection system to be equipped with all possible types of custom packers. The malware may also attempt to avoid being detected by a behavior-based malware detection system by checking the run-time environment and may refuse to run in sandbox 110. However, a packed sample file must ultimately unpack itself once loaded into a memory of sandbox 110 to perform the run-time environment check.

Memory dump 130 created by process monitor 120 of a new (unrecognized) malware sample that represents a known malware file that has been packed by a customer packer will have similar characteristics within memory dump 130 to those characteristics observed within a memory dump by the known malware file. Therefore, dump analyzer 140 may scan one or more of the memory snapshots within memory dump 130 using a signature-based scan of memory dumps of known malware stored within malware DB 150 to detect such malware samples that appear to be new to a file signature-based scan, but in reality represent known malware (or a variant thereof) that has been packed by a customer packer. Further, when the memory dump signature-based scan cannot determine whether a sample file represents malware, dump analyzer 140 may disassemble memory dump 130 and extract features, for example, functions, code-flows, code-blocks and strings that are contained or otherwise represented within the disassembled memory dump. Dump analyzer 140 may compare the features retrieved from the disassembled memory dump with features of known malware stored at malware DB 150. If the features within the disassembled memory dump match with those of a known malware sample, the sample file at issue is also determined to be malware. If a new malware is detected as a result of the feature comparison, dump analyzer 140 may generate a signature for memory dump 130 of the new malware and the signature may be added to malware DB 150. In this manner, the new malware may subsequently be detected by signature-based detection, which is faster than feature comparison based detection, which in this example includes a disassembly step.

In this manner, dump analyzer 140 may be used for detecting malware that cannot be detected with traditional behavior-based malware detection. Even though the malware has the ability to defeat a behavior-based detection system by refusing to execute within the context of sandbox 110, the malware will at least unpack itself (to perform the environment detection processing) at some time after being loaded into a memory within sandbox 110. Memory dump 130 of the malware may be created by process monitor 120 taking one or more snapshots of memory and then may be analyzed by dump analyzer 140 to detect the malware.

Dump analyzer 140 may also be used for providing an accurate classification of malware. For example, a sample file may be determined by other systems or sandbox 110 to represent malware but such systems may not be capable of providing an accurate classification or variant. Dump analyzer 140 may compare features of a memory dump of the sample file with features of known malware and calculate the similarity between the sample file and the malware based on the comparison (e.g., using a binary comparison tool, such as BinDiff of the like). In this manner, dump analyzer 140 may be able to provide a more accurate classification and variant name for the sample file based on the similarity measurement.

Figure 2:
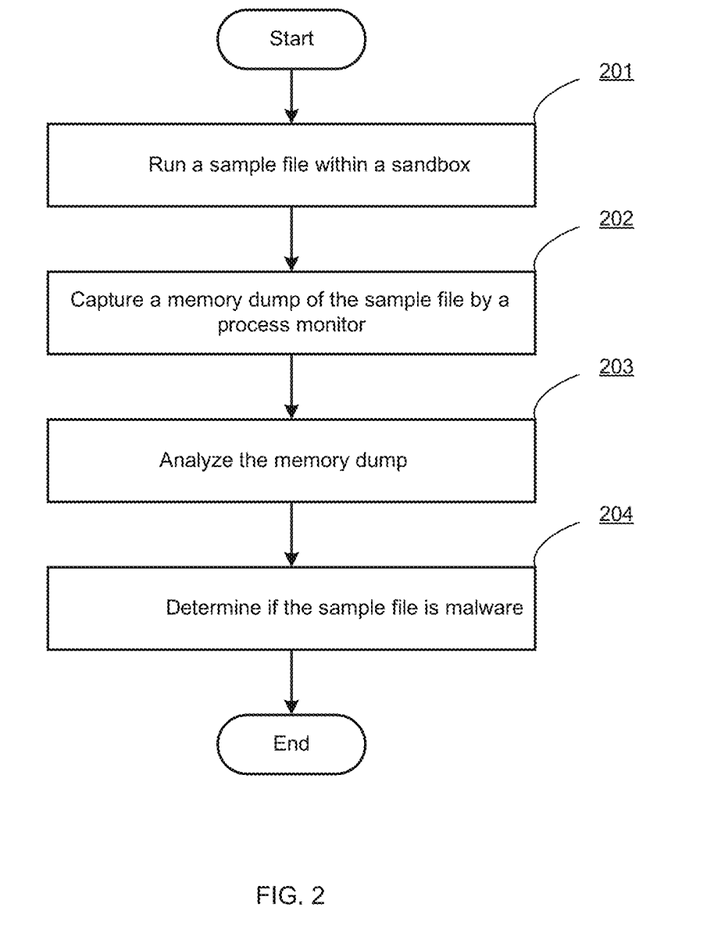
FIG. 2 is a flow diagram illustrating malware detection processing based on semantic analysis of memory dumps in accordance with an embodiment of the present invention.

FIG. 2 is a flow diagram illustrating malware detection and classification processing in accordance with an embodiment of the present invention. In present example, a sample file is loaded into a sandbox environment and a memory dump of the sample file is retrieved and analyzed to determine whether the sample file is malware.

At block 201, a sample file is loaded into memory for running it within a sandbox environment of a malware detector, such as malware detection and classification system 100 of FIG. 1. The sample file may be captured as it is attempted to be introduced into a private network by a network security appliance protecting the private network and may be submitted to the malware detector for malware evaluation. The sample file may be packed by a customer packer but may unpack itself while running within memory.

At block 202, a memory dump of the sample file is retrieved by a process monitor of the malware detector. The process monitor may monitor the target process that is running the sample file and take snapshots of the target process responsive to observing one or more predetermined events. The predetermined events triggering a snapshot of the target process may include, but are not limited to:
1. When the target process attempts to create a subprocess;
2. When the target process is terminated;
3. When target process attempts to write code to another process;
4. When there are tracked processes still in memory after a wait time defined by the process monitor.

Depending upon the number of predetermined events performed by the target process, the process monitor may take one or more memory snapshots of the target process. The snapshots of the process may be stored as memory dump files for subsequent analysis.

At block 203, the memory dump of the sample file is analyzed by the malware detector to determine whether it represents malware. When the memory dump contains multiple snapshots, one or more of such snapshots that are more suitable for use in connection with performing malware detection may be selected as described in further detail below with reference to FIG. 3. The memory dump may be scanned in two stages by the malware detector. During the first stage, the memory dump may be scanned by a signature-based malware detection engine. The signatures of memory dumps of known malware may be stored within a malware database of the signature-based malware detection engine. The memory dump of the sample file is matched against signatures of known malware samples. If the memory dump matches a signature of a known malware sample, the sample file is determined to represent the same type of malware as the known malware sample. The signature-based malware detection performed during a first stage is a fast way to check the memory dump, especially when it is implemented by an Application Specific Integrated Circuit (ASIC) acceleration engine. However, it may fail to detect malware when the memory dump of the malware has a different structure from the known malware (as a result of being packed by a custom packer, for example). When the sample file cannot be identified as malware is during the first stage, the memory dump of the sample file may be further subjected to a second stage during which features of the memory dump are analyzed. During the second stage, the memory dump may be disassembled and features of the memory dump may be extracted by the malware detector. The features of the memory dump are then matched against features of known malware.

At block 204, if the features of the memory dump match the features of a known malware sample, the sample file is identified as malware. The sample file may be further classified as being associated with a particular malware family and a particular variant based on the similarity with the known malware. An example of the two-stage memory dump scan is described in further detail below with reference to FIGS. 4A and 4B.

Figure 3:
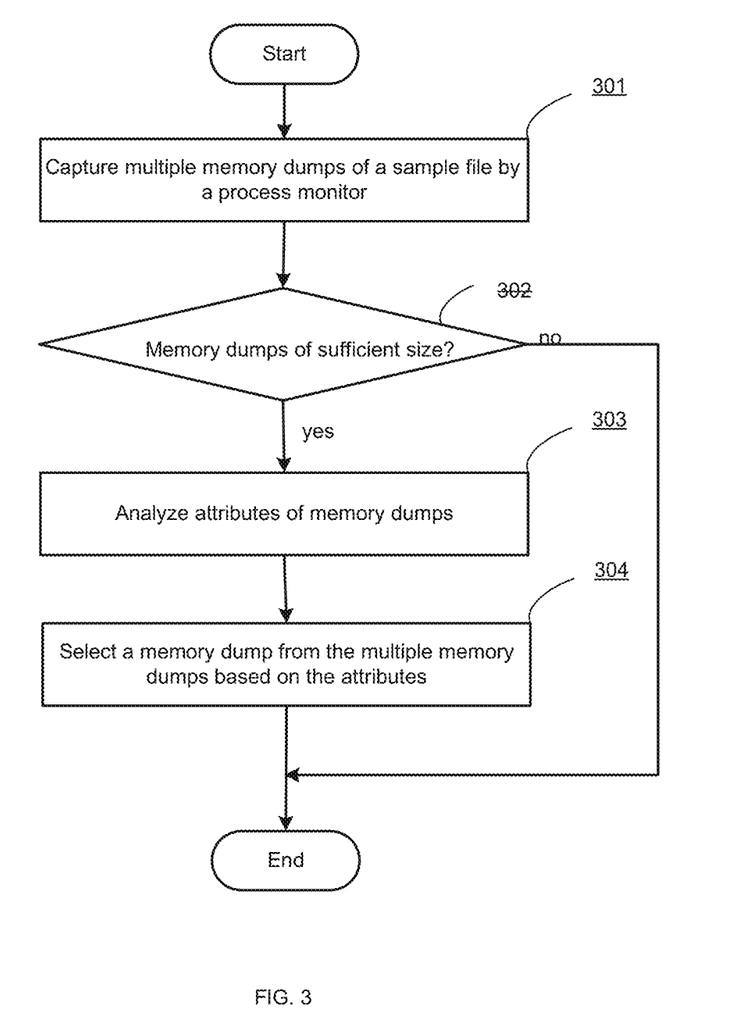
FIG. 3 is a flow diagram illustrating memory dump retrieving of a sample file by a process monitor in accordance with an embodiment of the present invention.

FIG. 3 is a flow diagram illustrating memory dump selection by a malware detector in accordance with an embodiment of the present invention.

At block 301, multiple memory dumps (which may also be referred to herein as memory dump files or memory snapshots) of a sample file are captured by a process monitor that monitors the execution of the sample file within the sandbox environment to detect the occurrence of one or more predetermined events, for example. The multiple memory dumps may be captured at appropriate opportunities during execution, if any, of the sample file.

At block 302, the malware detector checks the absolute and/or relative sizes of the memory dumps. If a memory dump is too small, it is not used as it will not contain sufficient information to perform a useful analysis. In one embodiment a memory dump of greater than or equal to a predetermined or configurable size that is indicative of the memory dump containing sufficient virus text strings may be selected for analysis. Alternatively, one or more of the largest memory dumps of those captured for the particular sample file may be selected for analysis. After one or more memory dumps are selected for analysis, the procedure continues with block 303, At block 303, attributes of memory regions of the selected memory dumps are retrieved by the malware detector. When a memory dump of a target memory region is captured by the process monitor, the memory region will have a memory attribute, indicating it is Readable (R), Writable (W) and/or Executable (X). The memory attribute is recorded by the process monitor when a memory dump is captured.

At block 304, if the memory attribute of a memory dump indicates a memory region contained therein is capable of being read, written and executed (e.g., the memory attribute=RWX), the memory dump is given the highest priority. If the memory attribute of the memory dump is capable of being read and executed (e.g., the memory attribute=RX), the memory dump is given a high priority. Memory dumps having other memory attributes (e.g., R, X, W, RW and WX) are assigned a lower relative priority. The malware detector may select a memory dump that has the highest priority among the multiple memory dumps for further semantic analysis. In another example, the memory dumps may be selected for further semantic analysis based on other system configurations.

Figure 4A:
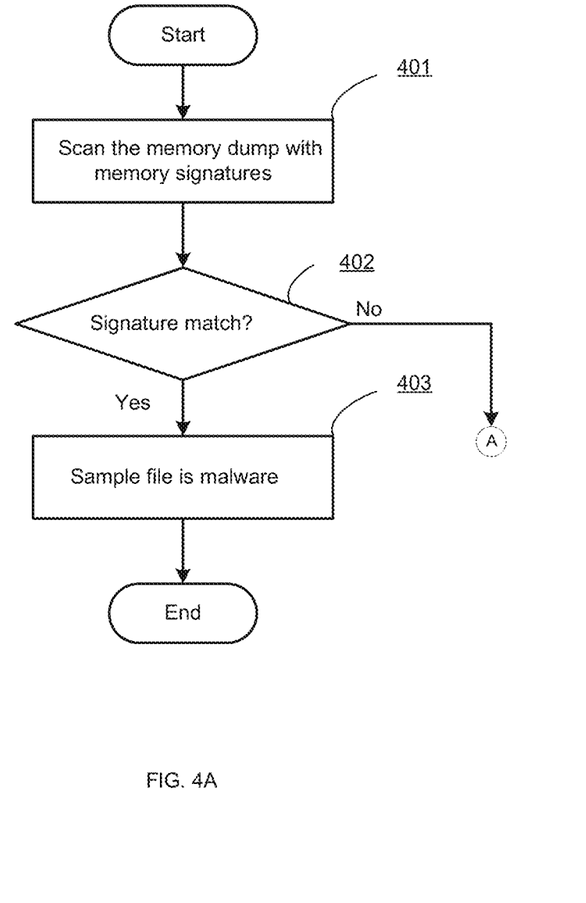
FIGS. 4A and 4B collectively represent a flow diagram illustrating memory dump semantic analysis processing in accordance with an embodiment of the present invention.
Figure 4B:
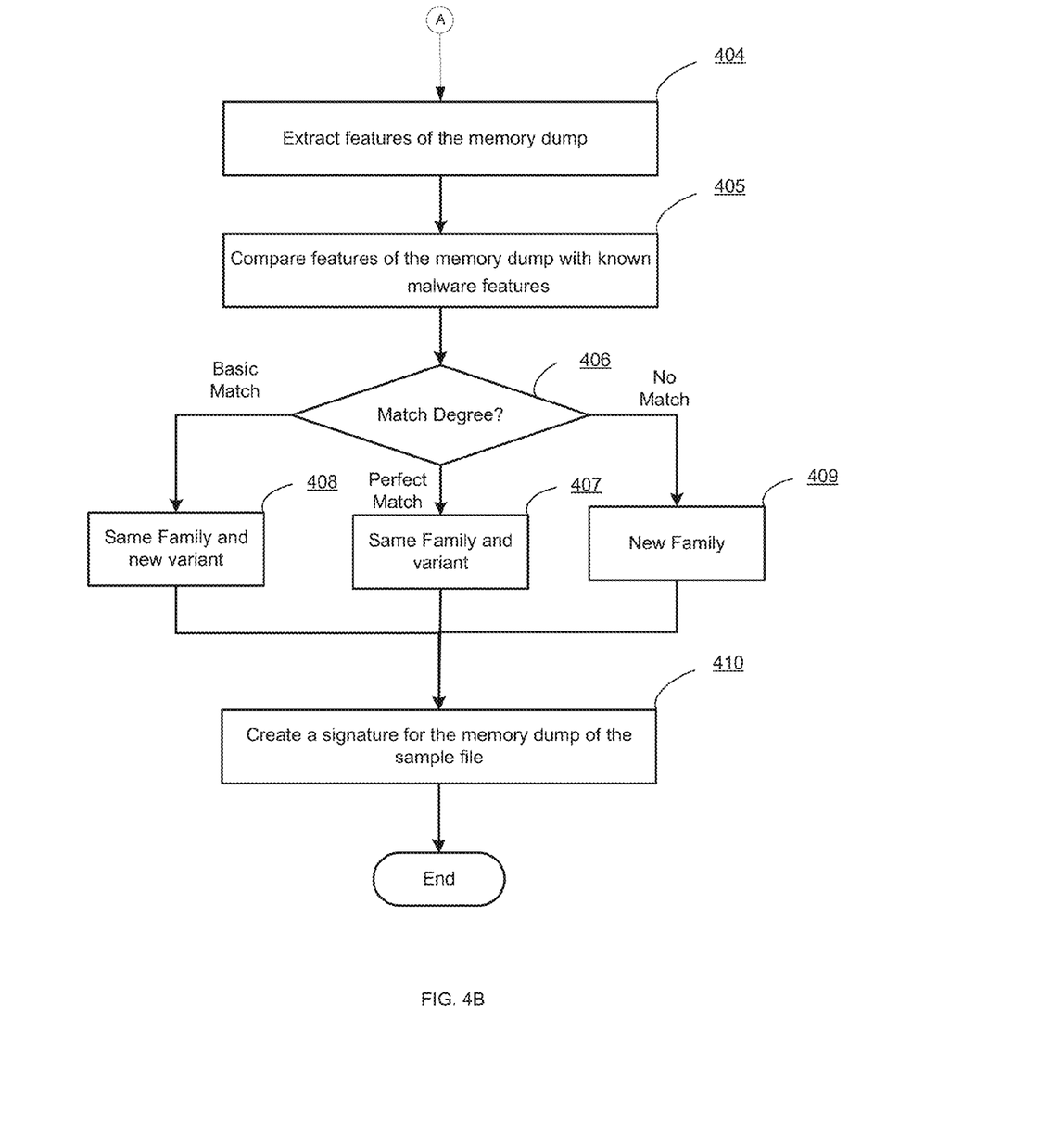

FIGS. 4A and 4B collectively represent a flow diagram illustrating memory dump semantic analysis processing in accordance with an embodiment of the present invention.

At block 401, a malware detector scans a memory dump of a sample file using signatures of memory dumps of known malware samples. A signature of a memory dump typically includes regular expressions and/or logical operators for matching various components or characteristics of the memory dump. The malware detector may make use of a malware database having stored therein signatures of memory dumps of known malware samples. As noted above, such signature-based matching can be performed very efficiently as, among other things, there is no need to perform disassembly of the memory dump.

At block 402, if a signature of memory dump of a known malware matches the memory dump of the sample file at issue, the sample file is determined to malware at block 403. As discussed above, this signature matching process may represent a first of two stages of memory dump analysis processing because this signature-based scanning is a fast way to perform malware detection. If no signatures of known malware are found to match the memory dump of the sample file at issue, a second stage—a semantic analysis of the memory dump of the sample file may be executed be by branching to block 404 of FIG. 4B.

At block 404, the malware detector may disassemble the memory dump and extract features from the disassembled code. The malware detector may then perform semantic analysis on the disassembled code to extract various features from the memory dump. The features of memory dump may include, but are not limited to, functions, code-flows, code-blocks and strings contained within the disassembled code. Because some meta-data, such as the entry point address of the process, may be lost when memory dumps are captured, a static heuristic semantic analysis engine may be used for extracting the features from the memory dump.

Consider the following example of a sample file:
Sample 1:
MD5: DC55B1713F209587E5A06D88ACD8047F
VNAME: MSIL/Injector.PZD!tr
DISCOVER DATE: Aug. 1, 2016
PACKER: UNKNOWN DOTNET PACKER A string extraction tool of the static heuristic semantic analysis engine may extract plain text strings shown below from the memory dump of Sample 1:

---

HostDirName
Software\CoffeeCup Software\Internet\Profiles
Software\FTPWare\COREFTP\Sites
Host
User
Port
PthR
SSH
profiles.xml
\FTP Explorer
Software\FTP Explorer\FTP Explorer\Workspace\MFCToolBar-224
Buttons
Software\FTP Explorer\Profiles
Password
PasswordType
Host
Login
Port
InitialPath
FtpSite.xml
\Frigate3
.ini
_VanDyke\Config\Sessions

---

Figure 5:
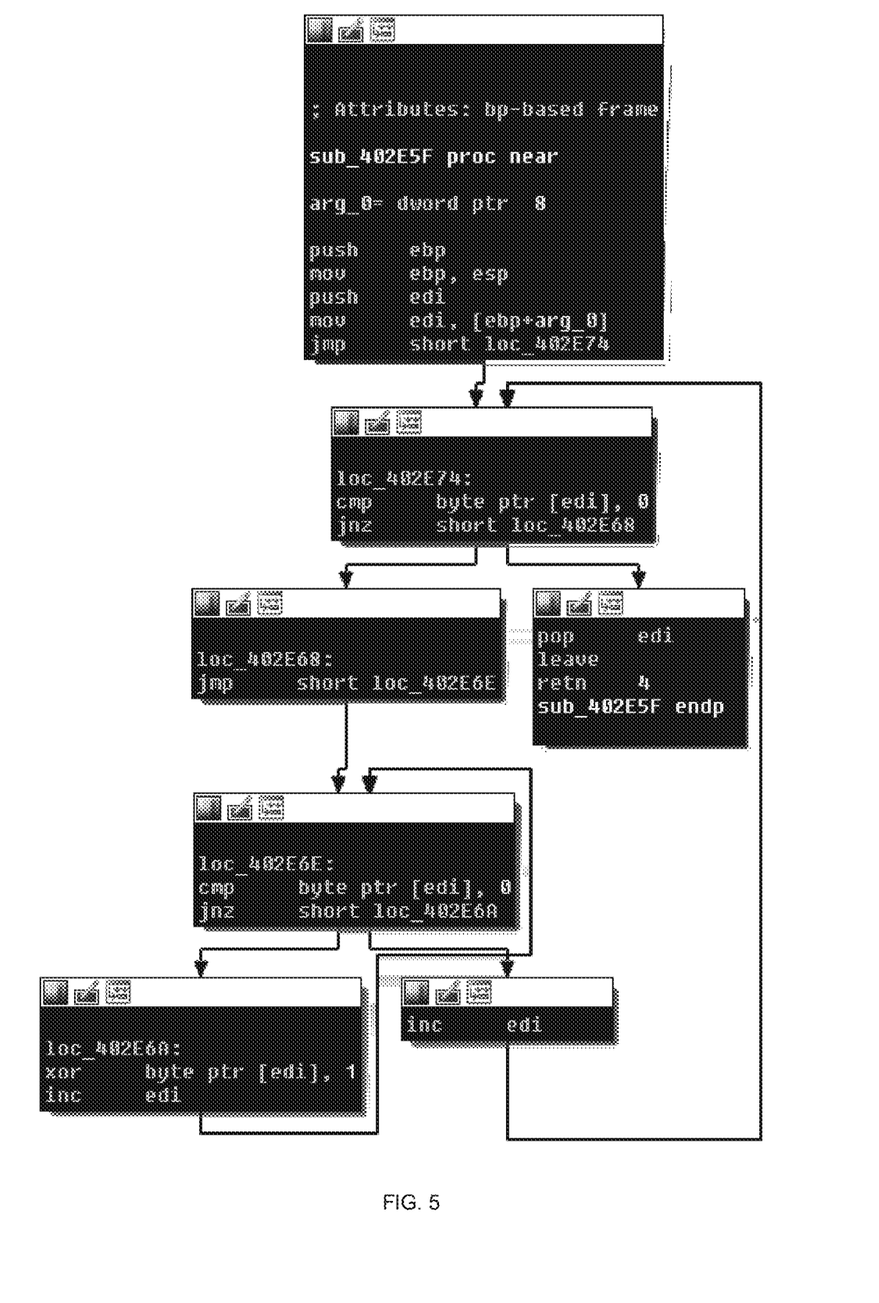
FIG. 5 illustrates an example of blocks and code flow of a function from a memory dump in accordance with an embodiment of the present invention.

The static heuristic semantic analysis engine may extract functions, code-blocks and code-flows from disassembled code of memory dump. FIG. 5 shows an example of blocks and code flow of a function from a memory dump of Sample 1.

Figure 6:
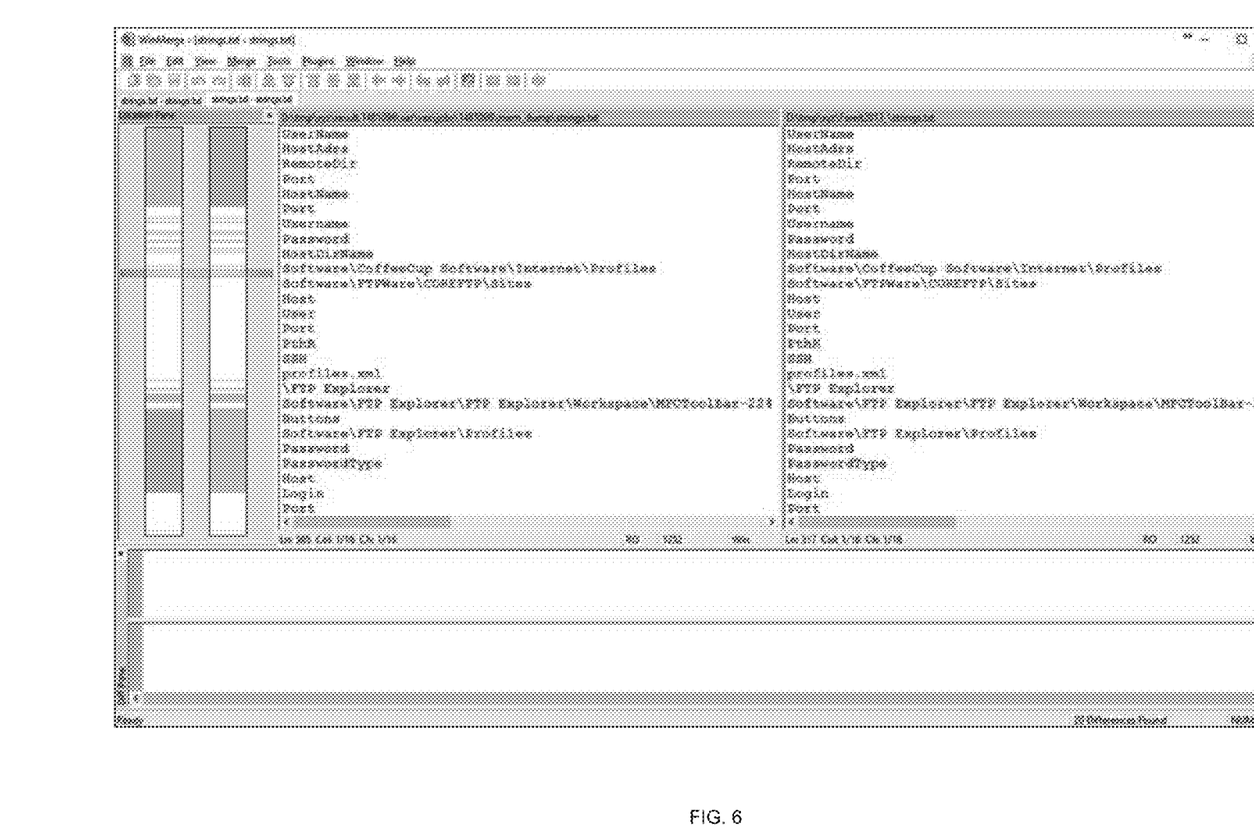
FIG. 6 illustrates a comparison of strings contained in memory dumps of a sample file and a known malware in accordance with an embodiment of the present invention.

At block 405, features of the memory dump of the sample file are compared with features of memory dumps of known malware samples. In one example, the list of plain text strings extracted from the memory dump of the sample file may be compared with the list of plain text strings of the known malware samples. When the disassembled code from a memory dump of the sample file has the same or similar strings in the same or similar order as one of the known malware samples, the malware detector may determine that the sample file is malware. FIG. 6 shows that the above Sample 1 has the same strings in the same order as a known malware sample in the malware database of the malware detector.

Figure 7:
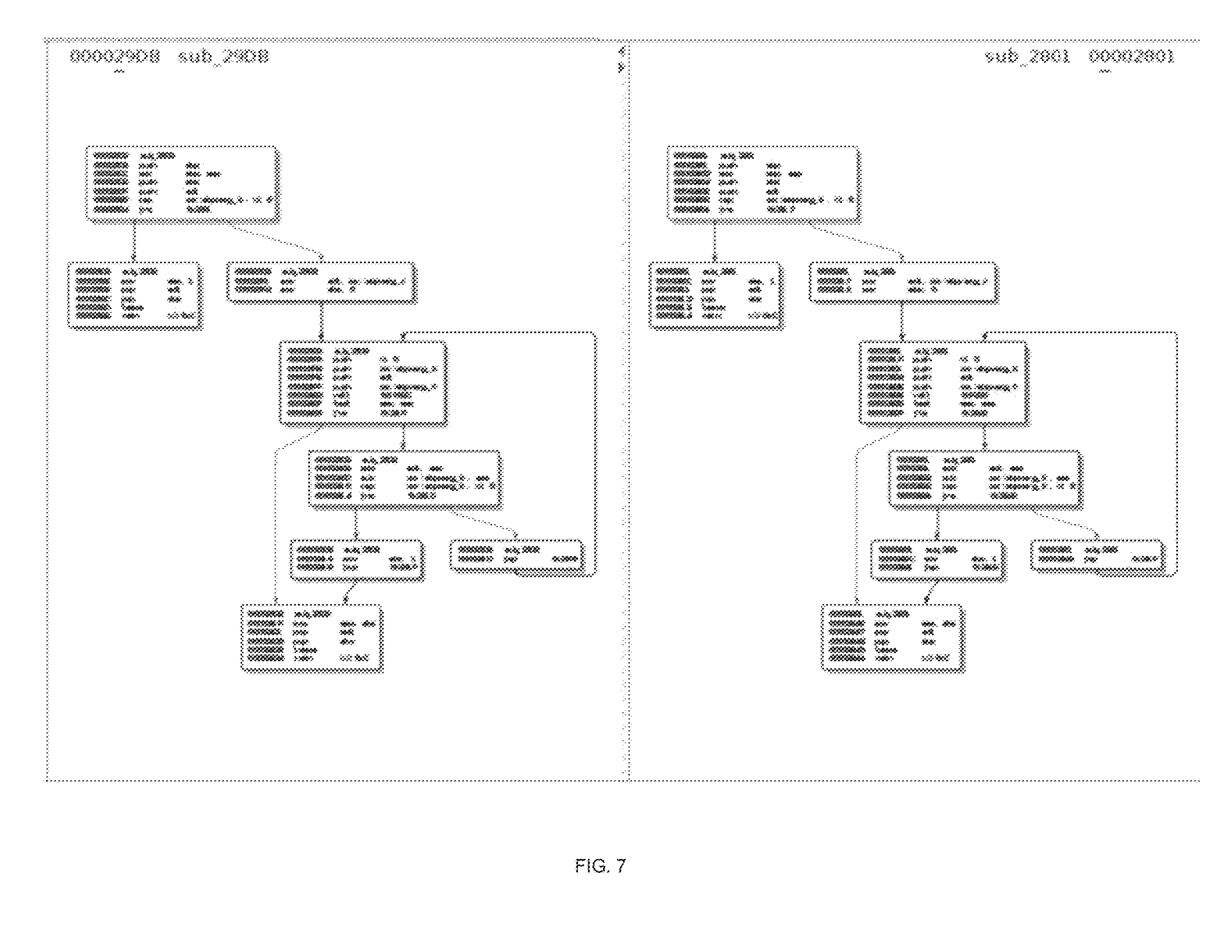
FIG. 7 illustrates a comparison of code flows of memory dumps of a sample file and a known malware in accordance with an embodiment of the present invention.

In another example, when the strings, if any, extracted from the disassembled code of the memory dump(s) of the sample file at issue do not match those of a known malware sample, then code flows extracted from the disassembled code of the memory dump(s) are compared with code flows of known malware samples. FIG. 7 shows an example of the comparison between code flows of Sample 1 and a known malware sample in which the code flows of Sample 1 and the malware are the same.

Figure 8:
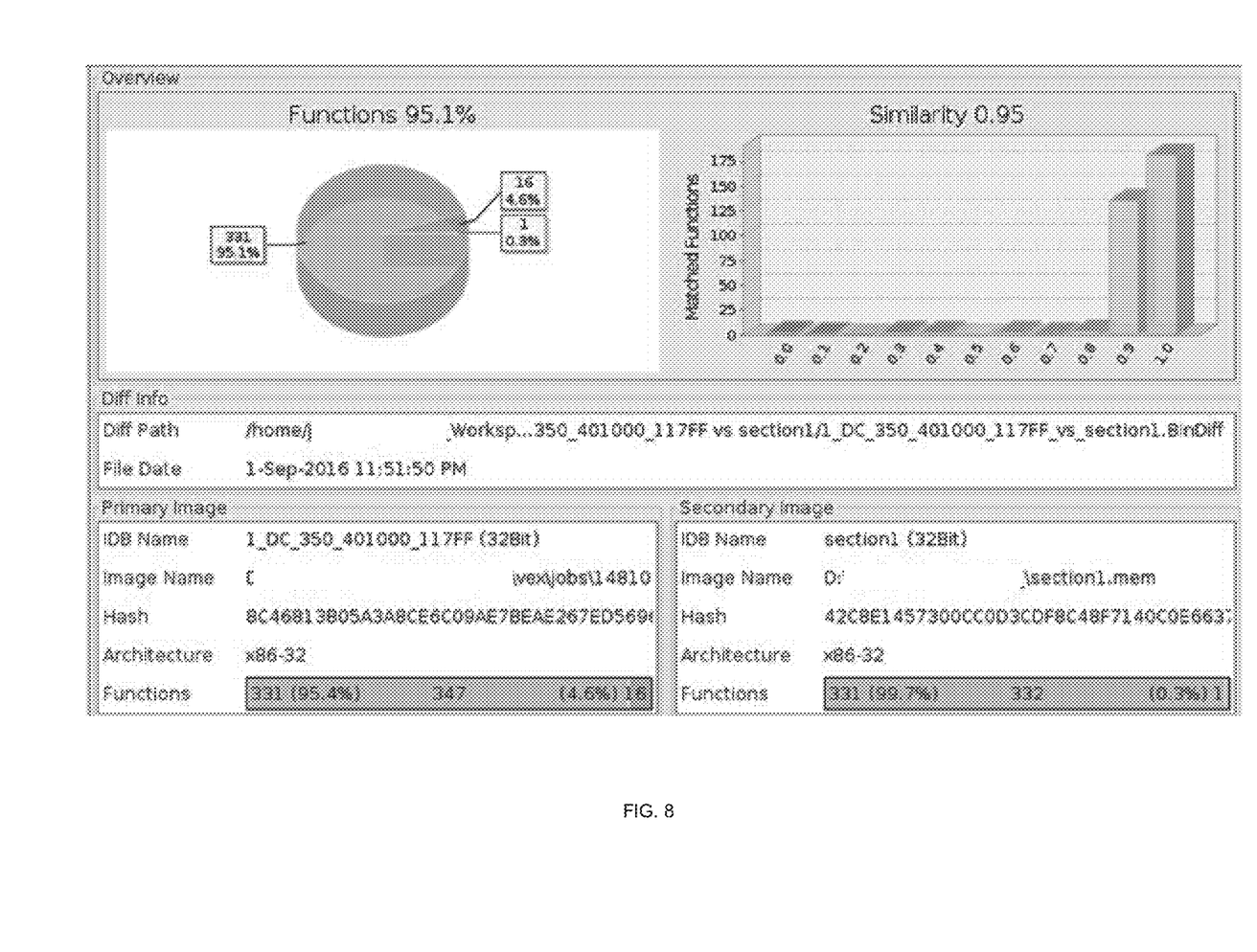
FIG. 8 illustrates an example of similarity of a memory dump of a simple file and a known malware in accordance with an embodiment of the present invention.

At block 406, the malware detector may further determine the similarity of the features extracted from the memory dump of the sample file with features of a known malware. The similarity of the sample file with that of a known malware sample may be calculated based on the rate or number of matched features extracted from the two memory dumps being compared. FIG. 8 shows an example of a memory dump of a sample file that has a similarity of 0.95 with a known malware sample. In the example shown in FIG. 6, the similarity of strings extracted from Sample 1 with a known malware sample may be 1.0 (i.e., 100%), which represents a perfect match.

The similarity of the memory dump of the sample file can be used for providing a more accurate classification of the sample file. For example, if the similarity exceeds a first predetermined threshold, e.g., the memory dump of the sample file almost perfectly matches a known malware sample, the sample file is classified as being the same family and variant as the known malware sample at block 407. If the similarity is less than the first predetermined threshold, but exceeds a second threshold, e.g., the memory dump of the sample file represents a basic match with a known malware sample, the sample file is classified as the same family as the known malware but will be assigned a new variant name at block 408. If the similarity is less than the second threshold, e.g., the memory dump of the sample file does not match that of a known malware sample, the sample file is classified as a new malware sample, if the sample file is known to be a malware. A new family is assigned to the sample file at block 409.

At block 410, the malware detector creates a new memory dump signature for the sample file and stores the signature within the malware database so as to allow the malware to be more quickly detected when subsequently observed by using the signature-based detection of blocks 401 to 403. The signature may include regular expressions and logical operators of components, attributes, characteristics and/or features of the memory dump that can be used for identifying the malware. In some examples, thousands of functions, code-blocks and code-flows may be extracted from the memory dump. Notably, however, most of such extracted features may represent commonly used functions, code-blocks and code-flows observed in many programs. As such, the features that are unique to the malware may be automatically selected or manually selected by a malware researcher to generate an appropriate memory dump signature. The unique and commonly used features may also be identified by a machine learning classifier that is trained by a large amount of samples of memory dumps.

Figure 9:
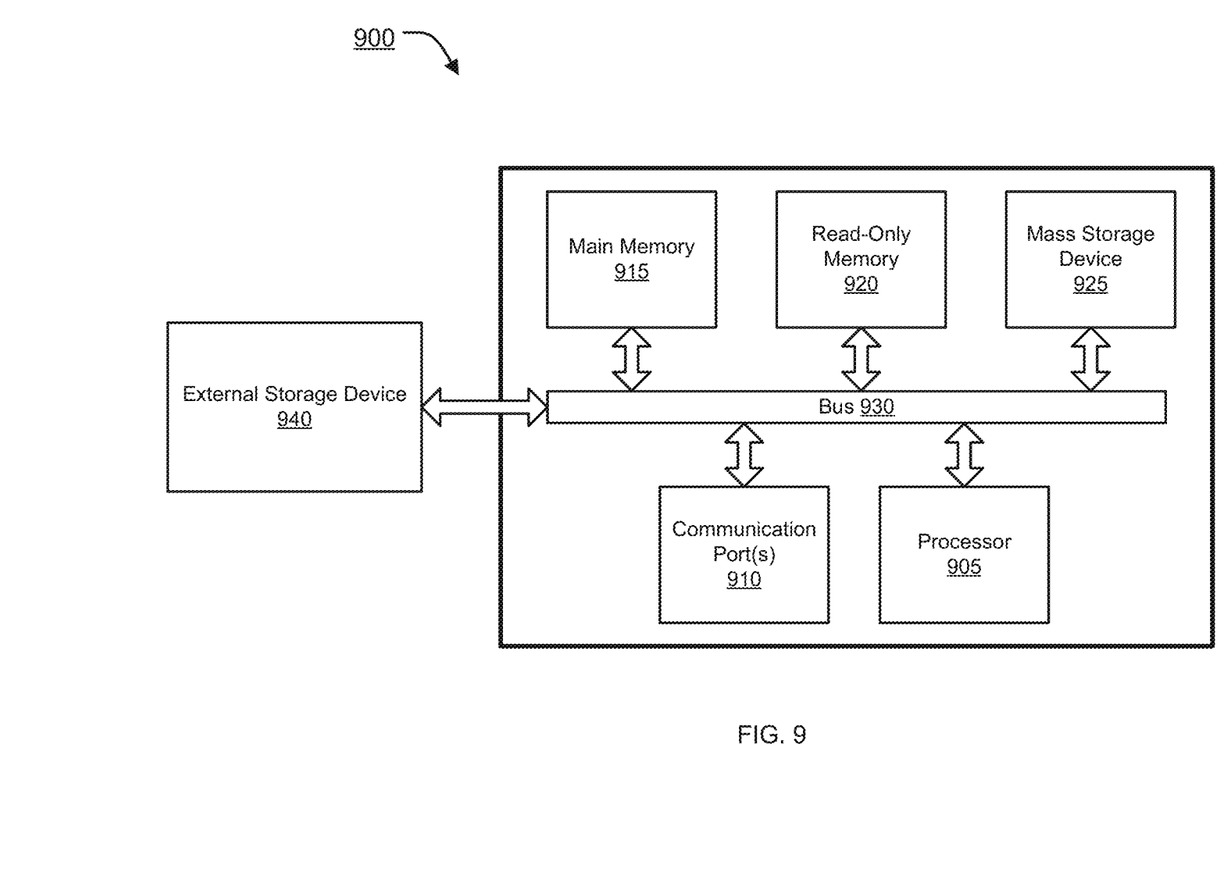
FIG. 9 is an exemplary computer system in which or with which embodiments of the present invention may be utilized.

FIG. 9 is an example of a computer system 900 with which embodiments of the present disclosure may be utilized. Computer system 900 may represent or form a part of a network security appliance (e.g., a firewall, a Unified Treat Management (UTM) gateway, an IDS or Intrusion Prevention System (IPS) or the like), a server or a client workstation.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 900 includes a bus 930, a processor 905, communication port 910, a main memory 915, a removable storage media 940, a read only memory 920 and a mass storage 925. A person skilled in the art will appreciate that computer system 900 may include more than one processor and communication ports.

Examples of processor 905 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 905 may include various modules associated with embodiments of the present invention.

Communication port 910 can be any of an RS-232 port for use with a modem based dialup connection, a 10/100 Ethernet port, a Gigabit or 10 Gigabit port using copper or fiber, a serial port, a parallel port, or other existing or future ports. Communication port 910 may be chosen depending on a network, such a Local Area Network (LAN), Wide Area Network (WAN), or any network to which computer system 900 connects.

Memory 915 can be Random Access Memory (RAM), or any other dynamic storage device commonly known in the art. Read only memory 920 can be any static storage device(s) such as, but not limited to, a Programmable Read Only Memory (PROM) chips for storing static information such as start-up or BIOS instructions for processor 905.

Mass storage 925 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 930 communicatively couples processor(s) 905 with the other memory, storage and communication blocks. Bus 930 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 905 to system memory.

Optionally, operator and administrative interfaces, such as a display, keyboard, and a cursor control device, may also be coupled to bus 930 to support direct operator interaction with computer system 900. Other operator and administrative interfaces can be provided through network connections connected through communication port 910.

Removable storage media 940 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   causing to be executed, by a malware detector running within a computer system, a sample file within a target process that is monitored by a process monitor of the malware detector;
   capturing, by the process monitor, a plurality of memory dumps associated with the sample file, wherein each of the plurality of memory dumps are captured responsive to the process monitor observing one or more corresponding predefined events or circumstances of a plurality of predefined events or circumstances, wherein a first memory dump of the plurality of memory dumps corresponds to a first predefined event or circumstance of the plurality of predefined events or circumstances relating to an attempt by the target process to create a sub-process;
   selecting, by the malware detector, at least one memory dump of the plurality of memory dumps based on relative sizes of the plurality of memory dumps and access attributes of memory regions of the plurality of memory dumps, wherein the access attributes of the memory regions are indicative of the memory regions being one or more of readable, writable and executable; and
   determining, by the malware detector, whether the sample file represents malware by analyzing characteristics of the selected at least one memory dump with reference to characteristics of memory dumps of a plurality of known malware samples.

2. The method of claim 1, wherein the plurality of predefined events or circumstances comprise:
   the first predefined event or circumstance;
   termination of the target process;
   an attempt by the target process to write code to another process; and
   existence of the target process in memory after a predetermined time period defined by the process monitor.

3. The method of claim 2, wherein said determining comprises scanning, by the malware detector, the selected at least one memory dump with a plurality of memory dump signatures associated with the plurality of known malware samples.

4. The method of claim 3, wherein when said scanning does not result in a match between the selected at least one memory dump and one of the plurality of memory dump signatures, then:
   causing to be disassembled, by the malware detector, the selected at least one memory dump;
   extracting, by the malware detector, features of the sample file from the disassembled memory dump; and identifying, by the malware detector, the sample file as malware when the extracted features satisfy a predetermined condition with respect to features from a disassembled memory dump of a known malware sample of the plurality of known malware samples.

5. The method of claim 4, wherein the features include one of more of functions, code-flows, code-blocks and strings of the memory dump of the sample file.

6. The method of claim 5, wherein said extracting comprises extracting the features by analyzing, by a static heuristic semantic analysis engine of the malware detector, the disassembled memory dump.

7. The method of claim 4, further comprising:
when the sample file is identified as malware, then generating, by the malware detector, a memory dump signature for the sample file based on the extracted features; and
storing, by the malware detector, the memory dump signature within a database of memory dump signatures.

8. The method of claim 7, wherein said generating comprises inputting, by the malware detector, the extracted features to a machine learning based signature generator, wherein the machine learning based signature generator is trained by features of known malware.

9. The method of claim 4, wherein the predetermined condition involves a measure of similarity between the extracted features and the features and wherein the method further comprises:
determining, by the malware detector, the measure of similarity between the extracted features and the features;
determining, by the malware detector, that the sample file belongs to a same family and a same variant as the known malware sample when the measure of similarity is equal to or greater than a first threshold; and
determining, by the malware detector, that the sample file belongs to the same family but a different variant than the known malware sample when the measure of similarity is less than the first threshold and is equal to or greater than a second threshold.

10. The method of claim 1, wherein the access attributes of the memory regions associated with a particular memory dump of the plurality of memory dumps are recorded by the process monitor when the particular memory dump is captured.

11. A computer system comprising:
non-transitory storage device having embodied therein instructions representing a malware detector; and
one or more processors coupled to the non-transitory storage device and operable to execute the malware detector to perform a method comprising:
causing to be executed a sample file within a target process that is monitored by a process monitor of the malware detector;
capturing, by the process monitor, a plurality of memory dumps associated with the sample file, wherein each of the plurality of memory dumps are captured responsive to the process monitor observing one or more corresponding predefined events or circumstances of a plurality of predefined events or circumstances, wherein a first memory dump of the plurality of memory dumps corresponds to a first predefined event or circumstance of the plurality of predefined events or circumstances relating to an attempt by the target process to create a sub-process;

selecting, by the malware detector, at least one memory dump of the plurality of memory dumps based on relative sizes of the plurality of memory dumps and access attributes of memory regions of the plurality of memory dumps, wherein the access attributes of the memory regions are indicative of the memory regions being one or more of readable, writable and executable; and
determining whether the sample file represents malware by analyzing characteristics of the selected at least one memory dump with reference to characteristics of memory dumps of a plurality of known malware samples.

12. The computer system of claim 11, wherein the plurality of predefined events or circumstances comprise:
the first predefined event or circumstance;
termination of the target process;
an attempt by the target process to write code to another process; and
existence of the target process in memory after a predetermined time period defined by the process monitor.

13. The computer system of claim 11, wherein said determining comprises scanning the selected at least one memory dump with a plurality of memory dump signatures associated with the plurality of known malware samples.

14. The computer system of claim 13, wherein when said scanning does not result in a match between the selected at least one memory dump and one of the plurality of memory dump signatures, then:
causing to be disassembled the selected at least one memory dump;
extracting features of the sample file from the disassembled memory dump; and
identifying the sample file as malware when the extracted features satisfy a predetermined condition with respect to features from a disassembled memory dump of a known malware sample of the plurality of known malware samples.

15. The computer system of claim 14, wherein the features include one of more of functions, code-flows, code-blocks and strings of the memory dump of the sample file.

16. The computer system of claim 15, wherein said extracting comprises extracting the features by analyzing, by a static heuristic semantic analysis engine of the malware detector, the disassembled memory dump.

17. The computer system of claim 14, wherein the method further comprises:
when the sample file is identified as malware, then generating a memory dump signature for the sample file based on the extracted features; and
storing the memory dump signature within a database of memory dump signatures.

18. The computer system of claim 17, wherein said generating comprises inputting, by the malware detector, the extracted features to a machine learning based signature generator, wherein the machine learning based signature generator is trained by features of known malware.

19. The computer system of claim 14, wherein the predetermined condition involves a measure of similarity between the extracted features and the features and wherein the method further comprises:
determining, by the malware detector, the measure of similarity between the extracted features and the features;
determining, by the malware detector, that the sample file belongs to a same family and a same variant as the known malware sample when the measure of similarity is equal to or greater than a first threshold; and determining, by the malware detector, that the sample file belongs to the same family but a different variant than the known malware sample when the measure of similarity is less than the first threshold and is equal to or greater than a second threshold.

20. The method of claim 1, wherein said selecting includes assigning a highest priority to memory dumps of the plurality of memory dumps containing a memory region in which the access attributes indicate the memory region is readable, writable and executable.

* * * * *